United States Patent [19]
Crawford et al.

[11] Patent Number: 5,986,558
[45] Date of Patent: Nov. 16, 1999

[54] MODULAR PRECHARGE CIRCUIT

[75] Inventors: William A. Crawford, Lakewood; David J. Michlovic, Avon Lake, both of Ohio

[73] Assignee: Marconi Communications, Inc., Cleveland, Ohio

[21] Appl. No.: 09/087,241

[22] Filed: May 29, 1998

[51] Int. Cl.$^6$ .................................................. G08B 21/00
[52] U.S. Cl. .................. 340/638; 340/639; 361/104; 361/115
[58] Field of Search .................. 340/638, 639, 340/664; 361/115, 636, 646, 656, 29, 104, 628, 629, 634

[56] References Cited

U.S. PATENT DOCUMENTS

| | | | |
|---|---|---|---|
| 3,558,982 | 1/1971 | Greenwood | 361/58 |
| 3,558,983 | 1/1971 | Steen | 361/58 |
| 3,725,742 | 4/1973 | Pollard | 361/100 |
| 4,573,113 | 2/1986 | Bauman | 363/48 |
| 4,642,733 | 2/1987 | Schacht | 361/363 |
| 5,012,161 | 4/1991 | Borowiec et al. | 315/247 |
| 5,233,330 | 8/1993 | Hase | 340/638 |
| 5,726,852 | 3/1998 | Trifuetti et al. | 361/115 |

*Primary Examiner*—Jeffery A. Hofsass
*Assistant Examiner*—Van T. Trieu
*Attorney, Agent, or Firm*—Jones, Day, Reavis & Pogue

[57] ABSTRACT

Provided is a modular precharge circuit capable of rapidly recharging an equipment circuit path prior to insertion of a modular fuse or modular circuit breaker. The precharge circuit includes a switch to begin the operation of precharging, and a charge indicator to indicate appropriate charging has occurred. Charging occurs through use of a resistive network which receives an inrush current due to capacitance in the equipment circuit path. Once an equipment circuit path has been precharged to a desired level, a charge indicator signifies such charging is complete and the precharged unit is removed whereafter an appropriate fuse module and/or circuit breaker module is inserted. The precharge circuit further includes a fusing element and an alarm indicator wherein when the circuit enters a fault state such that the fuse is open, the alarm indicator signifies such a situation. Additionally, when the charging indicator verifies the charging element is not precharging the circuit to a desired level, an indication of a short exists.

16 Claims, 5 Drawing Sheets

MODULAR PRECHARGE CIRCUIT

BACKGROUND OF THE INVENTION

The present invention is directed to a precharge circuit for use in conjunction with modular distribution units constructed to hold fuse and circuit breaker modules. Modular distribution units and cabinets with which the subject precharge circuit can be implemented are described in U.S. Pat. No. 5,726,852, entitled Modular DC Distribution Unit and U.S. patent application Ser. No. 08/854,894, entitled Multisided Communication Distribution Cabinet, both hereby incorporated by reference, and commonly assigned to the owner of the present application.

When a fuse or circuit breaker is inserted into a distribution unit supplying circuits that have equipment containing capacitance, a high inrush is generated. In such situations, the fuse will open or the circuit breaker will trip. As a distribution system will carry large numbers of such fuses and/or circuit breakers, failure of even a small percentage is undesirable. It has therefore been considered useful to provide a device and manner for quickly precharging the circuits associated with the fuse and/or circuit breaker modules.

SUMMARY OF THE INVENTION

The inventors have determined that it is beneficial to apply a charge to circuits having capacitance, prior to inserting the fuse or circuit breaker. By limiting the amount of current available to the circuit, by means of a current limiting device, the capacitance is safely charged up to a point that the fuse or circuit breaker can be inserted without the devices opening or tripping.

Therefore, a purpose of the present invention is to provide a precharge to capacitive circuits in a distribution system in order to limit the inrush current. The precharge is provided by insertion of a precharge circuit into the fuse/circuit breaker holders. The precharge circuit includes a resistive network that includes resistors, to allow charging to a safe level prior to insertion of the fuse and/or circuit breaker.

A further purpose of the present invention is to provide the precharge circuit in a modular configuration such that a number of fuse or circuit breaker holder locations may be tested and precharged in a rapid manner.

These together with other objects of the invention, along with the various features of novelty which characterize the invention, are pointed out with particularity in the claims annexed to and forming a part of this disclosure. For a better understanding of the invention, its operating advantages and the specific objects obtained by its uses, reference should be made to the accompanying drawings and the descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
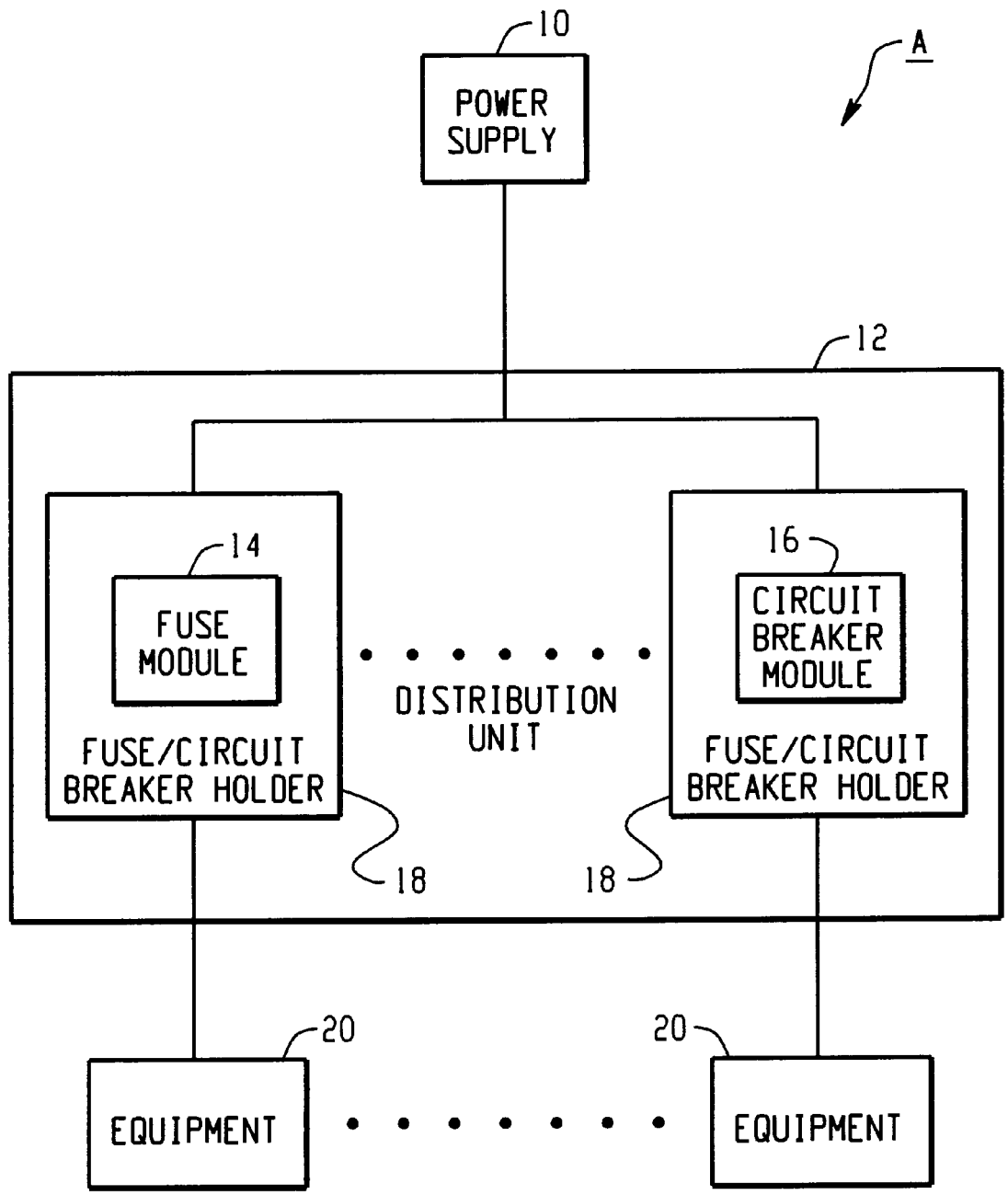
FIG. 1 is an overview of a power distribution system.

FIG. 1 illustrates a power distribution system A. Such a system can be implemented in a variety of environments including the telecommunication/communication industry.

Power Supply 10 is appropriately sized to meet the requirements of the system. For example, when distribution system A is used in the telecommunication/communication industry, it would be well within the knowledge of one of ordinary skill in the art to select a proper power supply for a desired installation.

With continued attention to FIG. 1, power supply 10 provides power to distribution unit 12. The present embodiment anticipates a modular DC distribution unit having interchangeable fuse modules 14 and circuit breaker modules 16 inserted within fuse/circuit breaker holders 18. In such a system, fuse/circuit breaker holders 18 are configured to interchangeably hold either one of circuit breaker module 14 and fuse module 16. Insertion of operational fuse module 14 and/or circuit breaker module 16 into an appropriate fuse/circuit breaker holder 18 results in a complete circuit path to equipment 20, which may be a variety of devices. Commonly such equipment includes a certain amount of capacitance. In such an environment when fuse modules 14 and/or circuit breaker modules 16 are inserted within fuse/circuit breaker holders 18, a large inrush current will be generated due to the capacitance in the circuit path.

Figure 2A:
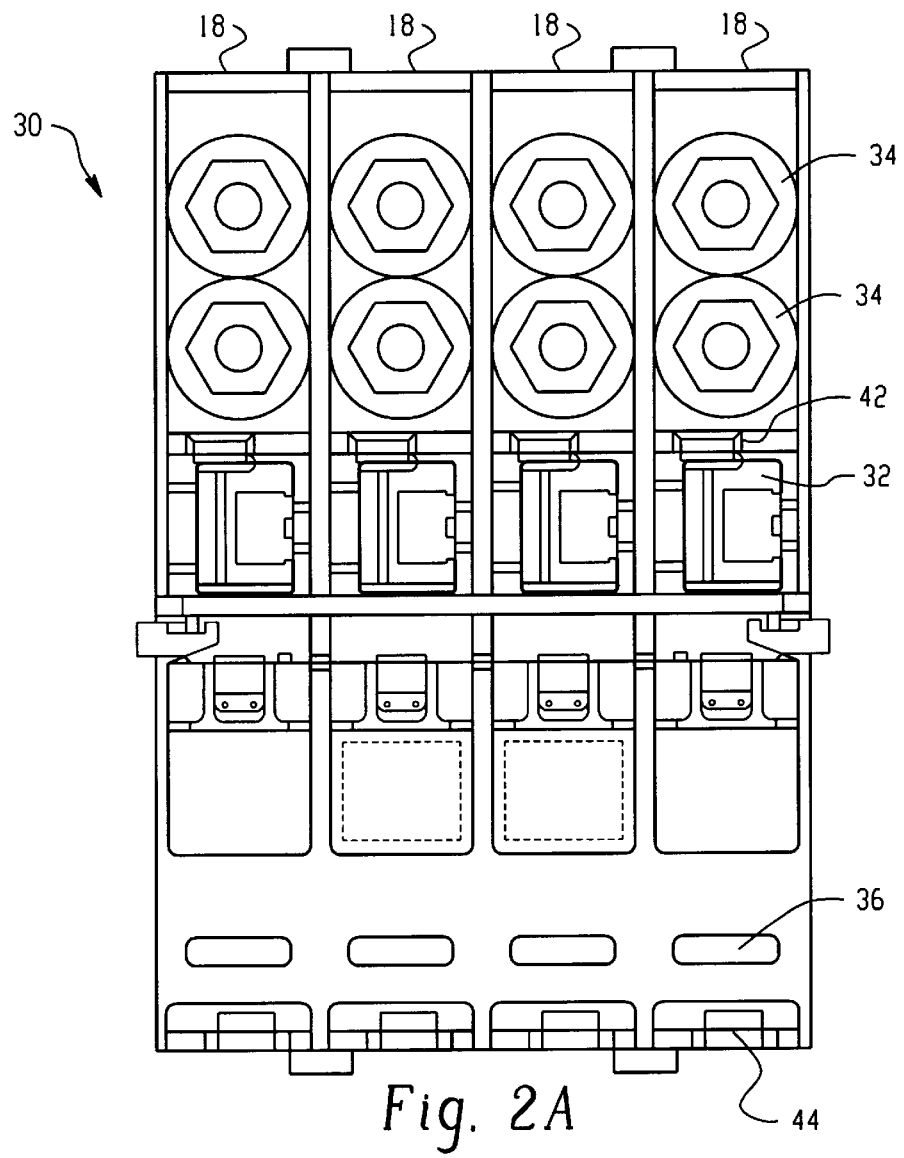
FIGS. 2a–2b illustrate a block assembly which carries a circuit breaker and infuse module in the distribution system.
Figure 2B:
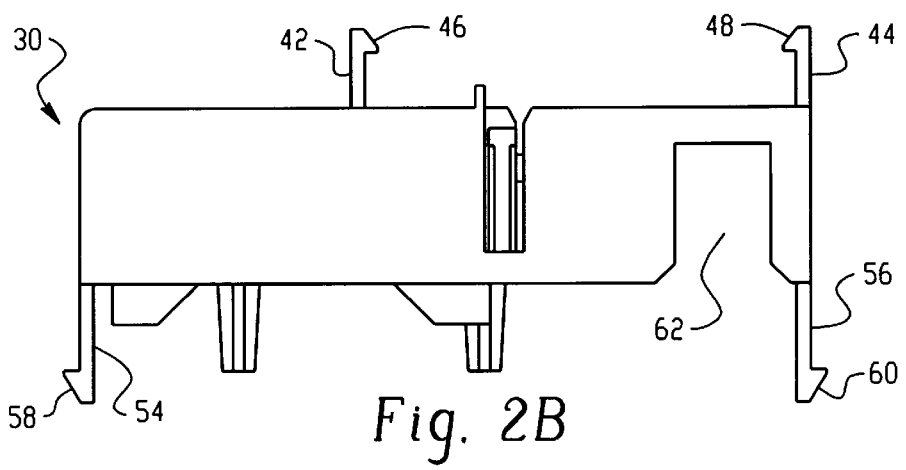

Turning attention to FIGS. 2A and 2B, a block assembly 30 having a plurality of fuse/circuit breaker holders 18 is described. In particular, FIG. 2A is a top view of block assembly 30 designed to interchangeably carry fuse modules 14 and/or circuit breaker modules 16. Block assembly 30 includes block assembly load contacts 32 configured as spring biased receptacles to create an electrical connection with the load contacts of fuse modules 14 and/or circuit breaker modules 16. Each of the block assembly load contacts 32 are also in electrical connection with load connectors 34, which are bolt and screw connections, to which external electrical lines are securely fastened. Block assembly 30 further includes block assembly apertures 36, sized to allow passage of line contacts of the fuse modules 14 and circuit breaker modules 16 through block assembly 30.

Turning attention to FIG. 2B, which is a side view of block assembly 30, this figure illustrates resiliently extending fingers 42 and 44 with claw portions 46 and 48 extending from an upper portion of block assembly 30. Fingers 42 and 44 are distanced from each other such that when either one of fuse module 14 or circuit breaker module 16, such as those described in U.S. Pat. No. 5,726,852, are inserted into block assembly 30, claws 46 and 48 engage and hold these modules. In FIG. 2B, resiliently extending fingers 42 and 44 appear as single fingers. However, as can be seen more clearly in FIG. 2A resilient fingers 42 and 44 are provided for each fuse/circuit breaker holder 18.

Returning attention to FIG. 2B, downwardly extending resilient fingers 54 and 56 are positioned facing outwardly of block assembly 30 such that claws 58 and 60 face in a direction opposite claws 46 and 48. Resilient fingers 54 and 56 along with claws 58 and 60 permit fastening of block assembly 30 without the use of any tool, whereby block assembly 30 may be snapped into a locked engagement with a backing panel mounted within a modular DC distribution unit such as described in U.S. Ser. No. 08/854,894.

Figure 3A:
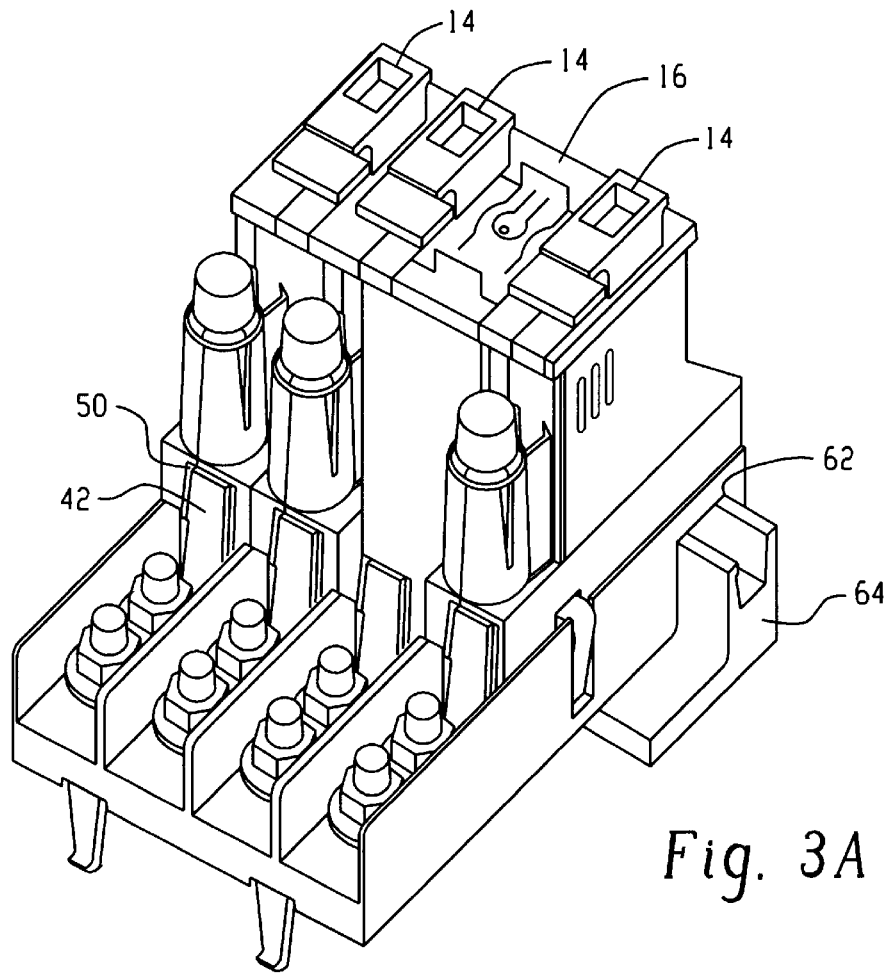
FIGS. 3a–3b graphically set forth the circuit breaker infuse modules interconnected with the block assembly which is in turn mated to a bus bar of the distribution system.

Block assembly 30 further includes a bus bar receiving section 62 where a properly sized bus bar, such as bus bar 64 of FIG. 3A, is received when block assembly 30 is mounted.

FIG. 3A also shows fuse modules 14 and circuit breaker modules 16 are inserted into block assembly 30. In this position, resilient extending fingers 42 and 44 (shown in FIG. 2B) lock the modules into secure engagement with block assembly 30 by having claws 46 and 48 snap into locking areas 50 and 51. When modules 14, 16 are to be removed from block assembly 30 the resilient legs 42, 44 are flexed away from modules 14, 16 disengaging claws 46, 48 from locking areas 50 and 51. With at least one of claws 46, 48 disengaged, removal force is applied to remove the modules. Line contacts and load contacts are also engaged with the corresponding receiving contacts in block assembly 30. Bus bar 64 which is secured in a bus receiving section will, in this configuration, be in contact with line contacts extending through block assembly apertures 36.

Figure 3B:
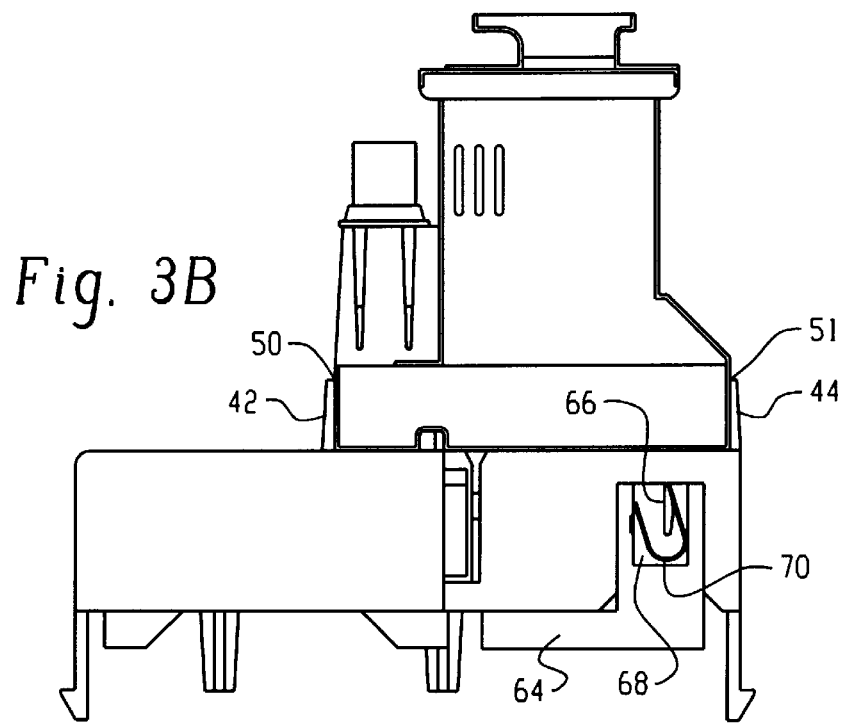

The above engagement is also shown in FIG. 3B. Line contact 66 of fuse module 14 is passed through aperture 36 (FIG. 2A) and into U-channel 68 of bus bar 64. It is noted that J-formed spring element 70 extends into the U-channel bus bar 64. The J-formed spring element 70 is inserted in U-channel of 68 to apply a tension between line contact 66 and bus bar 64 to provide a secure electrical contact between line contact 66 and bus bar 64.

Figure 4:
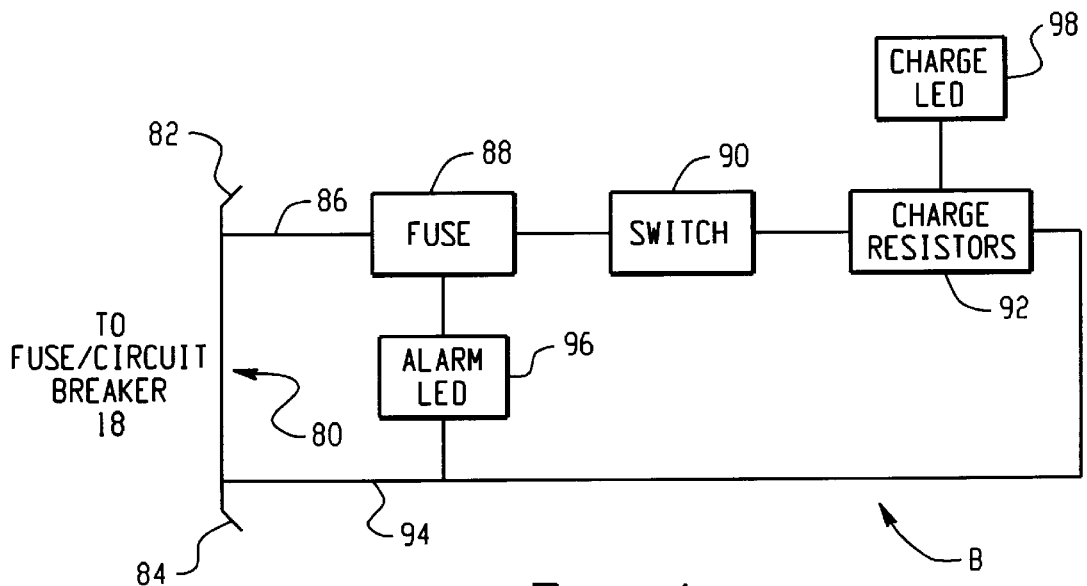
FIG. 4 is a schematic view of a precharged circuit according to the teachings of the present invention.

In consideration of the above-described environment, attention is turned to FIG. 4 which illustrates a precharge circuit B to be inserted into fuse/circuit breaker holder 18 of block assembly 30, in order to provide precharging to a circuit path including equipment 20. Precharge circuit B is inserted into one of the fuse/circuit breaker holder 18, prior to insertion of fuse holder 14 and/or circuit breaker 16.

As illustrated in FIG. 4, precharge circuit B is constructed with a contact 80 including a line contact portion 82 and a load contact portion 84. This section of the circuit is inserted into the fuse/circuit breaker holder 18 (also called block assembly 30). When in proper electrical contact, insertion of precharge circuit B provides a path from power supply 10 to equipment 20 of FIG. 1. While inserted, the high inrush current existing, due to capacitance of equipment 20, is absorbed by precharge circuit B. When inrush current has diminished to an acceptable level, precharge circuit B is removed and fuse module 14 or circuit breaker 16 is inserted in a now precharged circuit path from power supply 10 to one of equipment 20.

With more particular attention to precharge circuit B of FIG. 4, line contact 82 of connector 80 is connected to input line 86, which is in turn connected to fusing element 88. A switch 90 is interposed between fuse 88 and a charging element or network 92, commonly a network of charging resistors. Charging element 92 is further connected to load contact 84 via output line 94. Connected between fusing element 88 and output line 94 is an alarm indicator 96, such as alarm LEDs. Additionally, charging element 92 has an associated charge indicator 98, such as charging LEDs.

Charging network 92 is used to limit the current to equipment 20, which is ultimately intended to be protected by fuse modules 14 or circuit breakers 16. As previously noted, these modules are inserted after precharge circuit B has provided a charge to the circuit path including equipment 20.

Under normal operation, prior to insertion of a fuse module and/or circuit breaker module into a particular fuse/circuit breaker holder 18, precharge circuit B is inserted into the fuse/circuit breaker holder 18. When being inserted, switch 90 is in an "off" position. Therefore, a path to equipment 20 is not provided and charging network 92 is not receiving any current. Once the precharge circuit B has been connected to the fuse/circuit breaker holder 18, switch 90 is moved to an "on" position thereby completing a circuit path from power supply 10 to equipment 20. Turning switch 90 to an "on" position, causes charging network 92 to begin absorbing current generated due to the capacitance of equipment 20. Charge indicator 98 will illuminate thereby verifying charging is occurring. After a predetermined amount of time, dependant upon the particular power supply and environment in which the distribution network is being used, charge indicator 98 will turn off indicating charging has reached a predetermined level. In a normal power communication environment, this time period will be approximately 3–5 seconds.

Once charge indicator 98 has turned off, equipment circuit 20, will be sufficiently precharged. In a normal power communication environment, this level is below the Low Voltage Reset Level. Thereafter, precharge circuit B is removed from the fuse/circuit breaker holder 18. At this point, a fuse module 14 or circuit breaker module 16 is inserted into the fuse/circuit breaker holder position 18 to complete the charging. Therefore, in the present embodiment precharged circuit B does not fully absorb the capacitance charge of the selected circuit, but rather operates to a level where damage will not occur to the fuse module 14 or circuit breaker 16. The remainder of the charging occurs once the module is inserted. However, it is understood that in other embodiments it may be desirable to fully charge the circuit, prior to removal of precharge circuit B.

If during operation, charge indicator 98 does not turn off, switch 90 should be moved to an "off" position and the circuit checked for a short circuit.

Fusing element 88 is provided in series with switch 90. It is configured to open if the circuit path for equipment 20 has a short. Fusing element 88 is connected to alarm indicator 96 in order to provide an open fuse indication. Particularly, if alarm indicator 96 is illuminated, fusing element 88 has entered an open state and it is necessary to replace fusing element 88 with one of the same rating and type.

Figure 5:
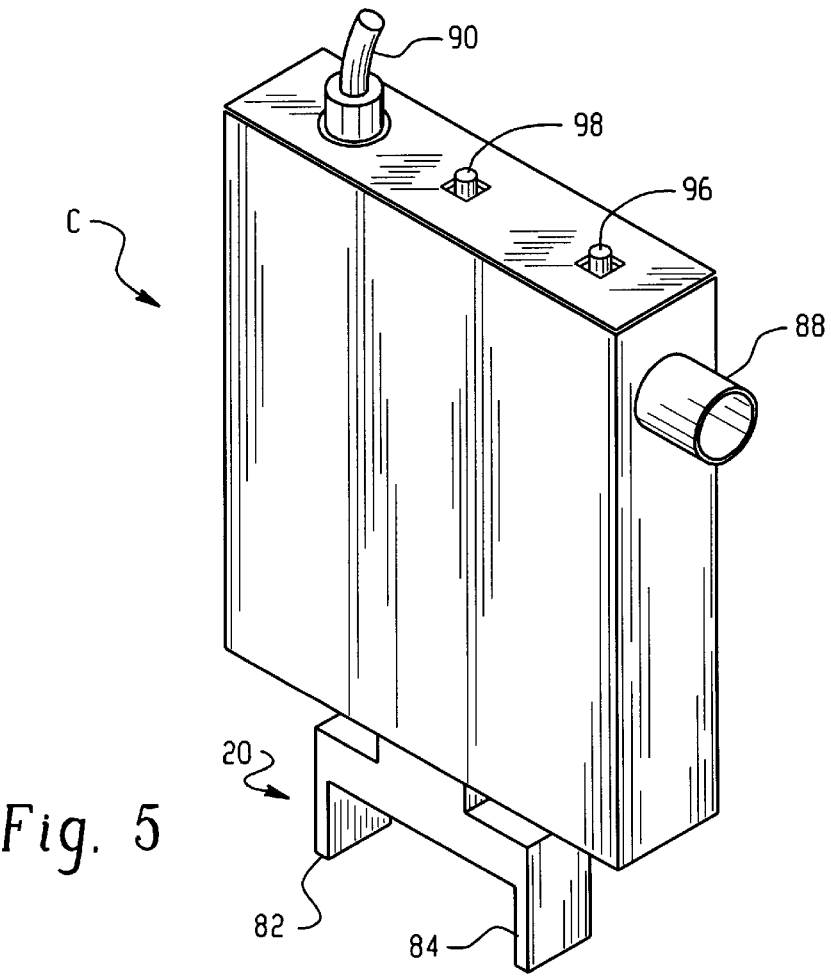
FIG. 5 is a conceptual view of the precharge circuit of FIG. 4 in a modular embodiment.

Turning attention to FIG. 5, the precharge circuit B of FIG. 1 can be constructed as a modular element C. More particularly, it may be designed in a shape so as to be inserted into the fuse/circuit breaker holders 18, of block assembly 30, which receive fuse modules 14 and/or circuit breaker modules 16 as shown in FIGS. 2A–3B.

However, it is to be appreciated as shown in the embodiment illustrated in FIG. 5, the body of module C is not configured to be held in a semi-permanent connection as the fuse modules 14 and circuit breaker modules 18. Particularly, whereas in the previous discussion these modules were held in position by claws 46 and 48, such is not the case with the precharge module C. Rather, since it is desired that this module be inserted and removed rapidly and repeatedly, it is not desirable, in a first embodiment, to provide semipermanent connections. Particularly, distribution unit 12 will include a plurality of block assemblies 30 which in turn include numerous holders 18. Thus, a beneficial aspect of the present invention is the speed with which an individual equipment circuit path may be precharged. Therefore, by providing a body which will not become semi-permanently engaged to the block assembly 30, such precharging time is decreased, as it allows insertion and removal of module C in an expeditious fashion.

When module C is inserted into one of the fuse/circuit breaker holders 18, line contact 82 and load contact 84 engage the block assembly 30 such that an electrical connection is made between bus bar 64 and line contact 82, and between load contact 84 and block assembly load contact 32, which is also in electrical connection with load connectors 34.

Therefore, when module C is located in block assembly 30 and switch 90 is placed in a charge position, i.e. "on", switch 90 completes the equipment circuit path and charge indicator 98 is illuminated, as power is provided across charging network 92. As time passes, charge rises on the capacitance in the equipment circuit path, and the voltage begins to share between the capacitance of equipment 20 and charging device 92. Under this scenario, after 3–5 seconds, depending upon the size of the capacitance in the equipment circuit path being precharged, charge indicator 98 will stop being illuminated. At this point, module C is removed from the fuse/circuit breaker holder position and a fuse module 14 or circuit breaker module 16 is inserted. The capacitance being precharged is in series with the precharging circuit.

It is noted that fusing element 88 can be changed without the necessity of entering the internal area of module C. Also, switch 90 is shown as a toggle-type switch in the present drawings, however, push button switches, automatic switches or other type of switches may be used. Further, although charge indicator 98 and alarm indicator 96 are LEDs, other known indication devices may be used, such as a sound indicator.

Figure 6:
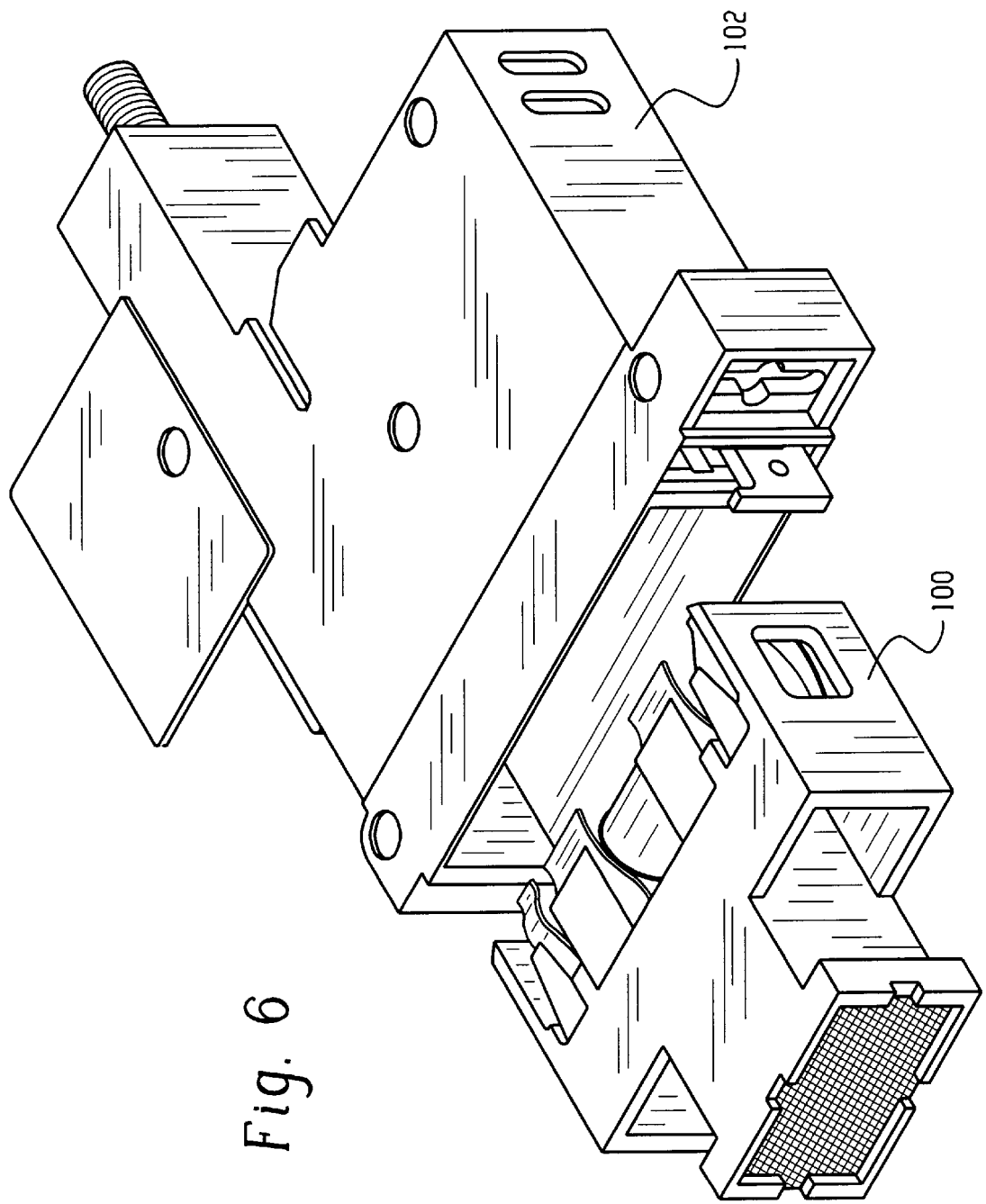
FIG. 6 is a conceptual view of a fuse block, fuse case assembly which can use the pre-charge circuit of the present invention.

FIG. 6 depicts a fuse block 100, fuse case 102 assembly which can use the precharge circuit such as the one illustrated in FIGS. 4 and 5. Specifically, pre-charge circuit C is inserted into fuse case 102, and precharging occurs. Thereafter precharge circuit C is removed and fuse block 100 is inserted for normal operation.

It is also to be appreciated that FIG. 5 illustrates but one modular embodiment of the present invention, and other appropriate modular shapes may be used which allow for the rapid insertion, testing, and removal of the modular precharge circuit. It is also to be appreciated the fuse/circuit breaker holders 18 shown in the present invention may be used in a variety of environments including cabinets such as illustrated in the U.S. Pat. No. 5,726,852.

With respect to the above description then, it is to be realized that the optimal dimensional relationships for the parts of the invention, to include variations in size, materials, shape, form, function and manner of operation, assembly and use are deemed readily apparent and obvious to one skilled in the art and all equivalent relations to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to falling within the scope of the invention.

In consideration thereof, we claim:

1. A power distribution system comprising:
   a power supply configured to supply a predetermined amount of power;
   a plurality of equipment configured to receive the power supplied by the power supply, wherein capacitances exist in at least some of the plurality equipment;
   a distribution unit interposed between the power supply and the plurality of equipment, for distributing power received from the power supply to the plurality of equipment, the distribution unit including a plurality of fuse/circuit breaker holders designed to hold fuse modules or circuit breaker modules which when inserted within one of the holders, completes an equipment circuit path from the power supply, through the distribution unit to the equipment associated with the particular holder; and
   a precharge circuit configured to be removably inserted within the fuse/circuit breaker holder prior to insertion of one of the fuse modules or circuit breaker modules, the precharge circuit having a charging network which absorbs an inrush current generated due to the capacitance of the equipment.

2. The power distribution system according to claim 1 wherein the precharge circuit having a charging network further includes:
   an input line;
   a fuse connected to the input line;
   a switch connected between the fuse and the charging network;
   a charging indicator connected to the charging network;
   an output line connected to the charging network; and
   a connector connected to the input and output lines.

3. The power distribution system according to claim 2 wherein the charging network is a resistive network comprised of a plurality of resistor elements.

4. The power distribution system according to claim 2 further including an alarm indicator connected to the fuse, wherein the alarm indicator is activated when the fuse is shorted.

5. The power distribution system according to claim 4 wherein the alarm indicator is an LED.

6. The power distribution system according to claim 2 wherein the charging indicator is an LED.

7. The power distribution system according to claim 1 wherein the precharge circuit is configured in a modular form allowing for insertion into the fuse/circuit breaker holder whereby the precharge circuit is electrically connected to the power supply and to the equipment.

8. The power distribution system according to claim 7 wherein the modular precharge circuit is designed for quick insertion and removal from the fuse/circuit breaker holder.

9. The power distribution system according to claim 1 wherein the fuse is located such that it may be replaced without entering into an internal area of the precharge circuit.

10. A modular precharge circuit for use in a communication distribution unit having a plurality of equipment within which exists capacitances, the precharge circuit comprising:
    an input line configured to receive an input from the communication distribution unit;
    a fuse connected to the input line;
    a switch connected to the fuse;
    a charging device connected to the switch, the charging device configured to charge an associated one of the plurality of equipment;

a charging indicator connected to the charging device;

an output line connected to the charging device; and a connector connected to the input and output lines configured so as to connect the input and output lines to the communication distribution unit, wherein the connector is the sole electrical connection between the communication distribution unit and the precharge circuit, and wherein the modular precharge circuit is a self-contained device which is configured to be completely removed from the communication distribution unit after the associated one of the plurality of equipment has been charged to a desired value.

11. The modular precharge circuit according to claim 10 further including an alarm indicator connected to the fuse, wherein when the fuse is shorted the alarm indicator is activated.

12. The modular precharge circuit according to claim 10 wherein the charging device is a resistive charging device.

13. The modular precharge circuit according to claim 10 further designed to have a body configuration to allow quick insertion and removal from the distribution unit.

14. A modular DC distribution unit comprising:

a backing panel attached in a vertical plane on the interior of the cabinet, the backing panel having a plurality of spaced openings;

a bus bar including a receiving area, connected to a surface of the backing panel;

a block assembly having a plurality of spaced claws carried on resilient legs extending from a bottom surface of the block assembly, the claws sized to allow passage through the spaced openings of the backing panel, and to provide resistance to removal from the spaced openings, allowing connection to the backing panel by tool-less insertion, the block assembly having block assembly load contacts, load connectors, block assembly apertures and pairs of claws carried on resiliently extending legs, located on an upper surface of the block assembly, the apertures of the connected block assembly aligned over the bus bar;

a circuit breaker module having a load contact formed for insertion into any one of the block assembly load contacts, and a line contact formed for insertion through the block assembly apertures and into contact with the bus bar;

a fuse module having a load contact formed for insertion into any one of the block assembly load contacts, and a line contact formed for insertion through the block assembly apertures, and into contact with the bus bar wherein the circuit breaker module and the fuse module are interchangeable in the block assembly; and a precharge circuit having a charging network, configured for connection to the load contact of the block assembly and through the block assembly apertures and into contact with the bus bar.

15. The modular DC distribution unit according to claim 14 wherein the circuit breaker module and fuse module each include locking areas in substantially identical locations with reference to the resilient extending legs on the upper surface of the block assembly and the precharge circuit is configured without the locking areas, thereby allowing the precharge circuit to be quickly inserted and removed from the block assembly.

16. The modular DC distribution unit according to claim 14 wherein the precharge circuit having a charging network further includes:

an input line;

a fuse connected to the input line;

a switch connected between the fuse and the charging network;

a charging indicator connected to the charging network;

an output line conected to the charging network; and a connector connected to the input and output lines.

* * * * *